(12) United States Patent
Bartling

(10) Patent No.: US 9,637,140 B2
(45) Date of Patent: May 2, 2017

(54) METERING DEVICE FOR GRANULAR MATERIAL

(71) Applicant: NOWE GMBH, Elze (DE)

(72) Inventor: Werner Bartling, Elze (DE)

(73) Assignee: NOWE GMBH, Elze (DE)

( * ) Notice: Subject to any disclaimer, the term of this patent is extended or adjusted under 35 U.S.C. 154(b) by 0 days.

(21) Appl. No.: 15/029,562

(22) PCT Filed: Oct. 15, 2014

(86) PCT No.: PCT/EP2014/072129
§ 371 (c)(1),
(2) Date: Apr. 14, 2016

(87) PCT Pub. No.: WO2015/055723
PCT Pub. Date: Apr. 23, 2015

(65) Prior Publication Data
US 2016/0332639 A1 Nov. 17, 2016

(30) Foreign Application Priority Data

Oct. 15, 2013 (AT) .............................. A 50664/2013

(51) Int. Cl.
*B60B 39/00* (2006.01)
*B61C 15/10* (2006.01)
(Continued)

(52) U.S. Cl.
CPC .............. *B61C 15/10* (2013.01); *B05C 19/04* (2013.01); *B05C 19/06* (2013.01); *B61C 15/102* (2013.01); *F16K 31/1221* (2013.01)

(58) Field of Classification Search
CPC ....... B61C 15/10; B61C 15/102; B05C 19/04; B05C 19/06; F16K 31/1221
(Continued)

(56) References Cited

U.S. PATENT DOCUMENTS 417,214 A * 12/1889 Austin .................. B60B 39/086
291/24
1,852,505 A 4/1932 Curtis
(Continued)

FOREIGN PATENT DOCUMENTS

DE 3410409 A1 9/1985
DE 29721340 2/1998
(Continued)

OTHER PUBLICATIONS

Schriftlicher Bescheid der mit der Internationalen Vorlaufigen Prufung Beauftragten Behorde, for PCT/EP2014/072129 filed Oct. 15, 2014.
(Continued)

*Primary Examiner* — J. Casimer Jacyna
*Assistant Examiner* — Benjamin R Shaw
(74) *Attorney, Agent, or Firm* — Paul D. Bianco; Gary S. Winer; Fleit Gibbons Gutman Bongini & Bianco PL

(57) ABSTRACT

A metering device for granular material, includes a housing that can be arranged inside a container for the granular material. The housing has at least one inlet for the granular material and an outlet, which outlet can be closed by a sealing element. The sealing element is arranged on a metering piston, which is preloaded by a spring and can be moved axially in a compressed-air cylinder, wherein a compressed-air connection is provided on the compressed-air cylinder such that the metering piston can be moved against the spring by compressed air and the outlet can be opened, and the spring has an at least two-stage design such that the stroke of the metering piston can be changed at least in two stages by varying the compressed air.

12 Claims, 5 Drawing Sheets

(51) Int. Cl.
  *B05C 19/04*   (2006.01)
  *B05C 19/06*   (2006.01)
  *F16K 31/122*  (2006.01)

(58) Field of Classification Search
  USPC .... 222/504, 282, 309, 511, 518, 559; 291/3, 291/24, 25
  See application file for complete search history.

(56) References Cited

U.S. PATENT DOCUMENTS

| | | | |
|---|---|---|---|
| 2,155,214 A | | 4/1939 | Aikman |
| 2,606,781 A | | 8/1952 | Loftus |
| 3,885,823 A | * | 5/1975 | Lee .................... B60B 39/04 291/15 |
| 5,020,701 A | * | 6/1991 | Donelson .......... B65G 69/0458 222/494 |
| 5,785,761 A | * | 7/1998 | Suzuki ................ B05B 1/3006 118/612 |
| 8,517,432 B2 | | 8/2013 | Bartling |
| 2006/0124672 A1 | * | 6/2006 | Penalver Garcia ..... B05B 1/306 222/504 |
| 2011/0187128 A1 | * | 8/2011 | Bartling ............... B61C 15/107 291/23 |
| 2013/0105524 A1 | * | 5/2013 | Saine .................. B05C 5/0237 222/504 |
| 2014/0291358 A1 | * | 10/2014 | Fliess ................... B05C 5/0225 222/504 |

FOREIGN PATENT DOCUMENTS

| | | |
|---|---|---|
| DE | 297213340 U1 | 2/1998 |
| EP | 0656292 A1 | 6/1995 |
| EP | 2326519 A1 | 6/2011 |
| FR | 593382 A | 8/1925 |
| FR | 803127 A | 9/1936 |
| FR | 813959 A | 6/1937 |
| FR | 2267501 A1 | 11/1975 |
| GB | 857246 A | 12/1960 |
| WO | 2010031831 A1 | 3/2010 |

OTHER PUBLICATIONS

International Search Report dated Jan. 14, 2015 for International Application No. PCT/EP2014/072129 filed Oct. 15, 2014.
Written Opinion dated Apr. 23, 2015 for International Application No. PCT/EP2014/072129 filed Oct. 15, 2014.
International Preliminary Report on Patentability for International Application No. PCT/EP2014/072129 filed Oct. 15, 2014.
Office Action dated Sep. 1, 2014 issued in Austrian Application No. A50664/2013 filed Oct. 15, 2013.
English translation of International Preliminary Report on Patentability for PCT/EP2014/072129, filed Oct. 15, 2014.

* cited by examiner

METERING DEVICE FOR GRANULAR MATERIAL

FIELD OF THE INVENTION

The invention relates to a metering device for granular material, comprising a housing that can be arranged inside a container for the granular material, the housing comprising at least one inlet for the granular material and an outlet, which outlet can be closed by means of a sealing element.

BACKGROUND

The term "granular material" refers to some granular to powdery, easily pourable solid matter, for example grit or fine sand, such as is used for the improvement of the braking effect between the wheels of vehicles and the roadway. For instance, in the case of rail-bound vehicles, granular material or sand from a container is conveyed via a metering and conveying device via a nozzle in front of the rail wheels and into the gap between rail wheel and rail, to increase the frictional resistance between the rail wheel and the rail and reduce the breaking distance.

The EP 2 326 519 B1 describes such a sand metering device for sand spreading systems for vehicles, wherein metering of the sand is effected via an electrically operable stroke magnet. The granular material or the sand can be conveyed downstream of the metering device in various ways, e.g. mechanically or pneumatically.

The DE 297 21 340 U1 shows a sand metering device which is arranged on the sand storage container, comprising a valve which is provided in the outlet opening and is triggered via compressed air. When the valve is open, sand flows from the sand storage container through the outlet opening.

The FR 593 382 A shows a compressed-air actuated sand metering device arranged in a sand storage container, wherein the outlet opening is closed by a valve from the bottom side.

From DE 34 10 409 A1 there is known a device for dispensing sand for rail vehicles, comprising a laterally movable metering piston and a compressed-air supply for supplying the metered sand to the desired location, in particular in front of the wheel of the rail vehicle. The entire weight of the sand rests on the sand inlet, which is why in particular in the case of wet sand blockades may occur. Furthermore, moisture can enter the sand container and lead to clumping together of the sand or at least to a deterioration of the flowability of the sand. The FR 813 969 shows a construction of a metering device, in which the inlet is arranged below the container for the granular material and is closed by a cover. In this case, too, the entire force of the granular material in the container for granular material acts in a disadvantageous way on the inlet or the closing cover, thus complicating the actuation of the cover and not making possible an exact metering.

Further sand metering devices that are arranged inside the sand storage container and are operated by means of compressed air are disclosed in GB 857,246 A or EP 656 292 A1, respectively.

What is a disadvantage in some known metering devices is that different energy forms and energy sources, for example, electrical energy for operating the stroke magnet of the metering device and compressed air for conveying the granular material are required. Since in particular in older rail-bound vehicles or other systems that require metering and conveying of a granular material often only compressed air is available as energy source, some electrically working metering devices are ruled out.

SUMMARY OF THE INVENTION

Therefore, in at least some embodiments of the present invention an above cited metering device for granular material is provided, which can be operated without electrical energy. In particular, the metering device according to the invention should be suitable for retrofitting existing systems and vehicles and should be able to be used in a simple and fast manner.

According to the invention it is provided that the at least one inlet is arranged laterally on the housing and in a manner obliquely extending downwards, that the sealing element is arranged on a metering piston, which is preloaded by means of a spring and can be moved axially in a compressed-air cylinder, wherein a compressed-air connection is provided on the compressed-air cylinder such that the metering piston can be moved against the spring by means of compressed air and the outlet can be opened, and the spring has an at least two-stage design such that the stroke of the metering piston can be changed at least in two stages by varying the pressure of the compressed air, a device for adjusting the maximum stroke of the metering piston is provided and a bushing made of a dimensionally stable material is arranged in the area of the bushing. The metering device of the present type can thus be operated exclusively with compressed air, which in the case of some systems or vehicles, in particular rail-bound vehicles is available anyway. The construction of the metering device of the present type is relatively simple, sturdy, and low-maintenance. Arranging the at least one inlet laterally on the housing will allow the granular material to be supplied into the metering device in an optimum manner. The oblique arrangement of the container for the granular material and the inlet(s) of the metering device helps support the granular material flow to the metering device by force of gravity. The metering of the granular material takes place by adjusting the stroke of the metering piston and the duration of the opening phases of the metering piston. When using the metering device for a spreading system to improve the braking effect of a rail-bound vehicle, the metering piston is constantly kept open during the braking process, so that the granular material or the sand can be conveyed in to between the rail wheel and the rail for the entire duration of the braking process to increase the friction. Varying the pressure of the compressed air allows to vary the metering of the granular material. A stage-like variation, for example, can be obtained by a single spring with progressive spring characteristic or by several springs with different spring rates. All that is required is a pressure of the compressed air that can be changed in at least two stages. For example, a speed-dependent metering of the granular material can be achieved by such a two-stage or multi-stage metering. With low speeds of a rail-bound vehicle, in the case of braking, a smaller amount of granular material can be discharged, thus also minimizing dust pollution, whereas in the case of higher speeds a maximum discharge of granular material takes place for a maximum braking effect. The amount of granular material passing into the subsequent conveying device when the metering piston is open can be changed by the device for adjusting the maximum stroke of the metering piston.

Due to the bushing made of a dimensionally stable material and arranged in the area of the outlet, on the one side, the sealing of the container for the granular material during the time when the metering piston is closed can be improved and, on the other side, the wear of the components of the metering device can be reduced. The sealing of the sealing element of the metering piston towards the bushing is of particular importance for any granular material that must not get wet, e.g. sand, since the ingress of moisture in the container for the granular material may lead to the clumping together of granular material or sand, whereby metering and conveying of the granular material may become difficult or be blocked.

The bushing is preferably made of a highly wear-resistant plastic, for example ultra-high molecular polyethylene. Thus, the operating time of the bushing and the entire metering device is increased and the maintenance interval is prolonged.

The sealing element arranged on the metering piston is preferably made of a wear-resistant, elastic material. Such a wear-resistant, elastic material, for example, polyurethane offers optimum properties in terms of sealing the outlet of the metering device and in terms of wear due to frictional effect of the granular material. Of course, the metering piston may also be designed integrally with the sealing element.

When the compressed-air cylinder and the metering piston are arranged vertically, by using the force of gravity an optimum flow of the granular material through the metering device can be achieved without any additional supporting measures. Such an arrangement also facilitates both the disassembly and assembly of the wear components, in particular the sealing element and the bushing at the outlet, which are arranged below the compressed-air cylinder.

The adjustment device, for example, can be formed by an adjustment screw. This is the simplest and cheapest possibility of adjusting the maximum stroke of the metering piston.

A stage-by-stage variation of the piston stroke can be achieved for instance by arranging different springs, wherein the first spring can be compressed by a lower pressure and the second spring can be compressed by a higher pressure. All that is required is a pressure of the compressed air that can be changed in at least two stages.

According to another embodiment according to the invention the bushing can be adjustable in the direction of the axis of the metering piston such that the maximum stroke of the metering piston can be changed. The advantage over an adjustment screw is that for adjusting the maximum stroke of the metering piston the metering device does not have to be disassembled again from the storage container for the granular material, which means a considerable expense, since the entire storage container must be emptied and refilled. Adjustment of the bushing can be effected in a simple manner from outside. Two opposite inlets are preferably provided on the housing of the metering device. By means of arranging several inlets, the amount of granular material passing through the outlet when the metering piston is open can be increased, without having to increase the stroke of the metering piston.

According to another feature of the invention, the at least one inlet is arranged at an angle of 30 to 40° to the horizontal line, in a manner extending obliquely downward.

Fastening elements for fastening a device for conveying the granular material can be provided on the bottom side of the housing. In this manner, the connection to the subsequent conveying device is facilitated at best by interposing a sealing ring.

According to another feature, a sealing ring made of an elastic material, preferably an O-ring is arranged in the outlet, which O-ring forms an annular sealing area, on which the sealing element rests so as to close the outlet.

According to another embodiment, for fine adjustment of the amount of granular material to be discharged, a device for deforming the sealing ring may be provided, for example a screw bush rotatable against the sealing ring. The internal diameter of the sealing ring can be changed and consequently the granular material flowing through can be influenced by the elastic deformation of the sealing ring.

BRIEF DESCRIPTION OF THE DRAWINGS

The invention will be illustrated in detail by way of the enclosed drawings, in which.

DETAILED DESCRIPTION OF EMBODIMENTS

Figure 1:
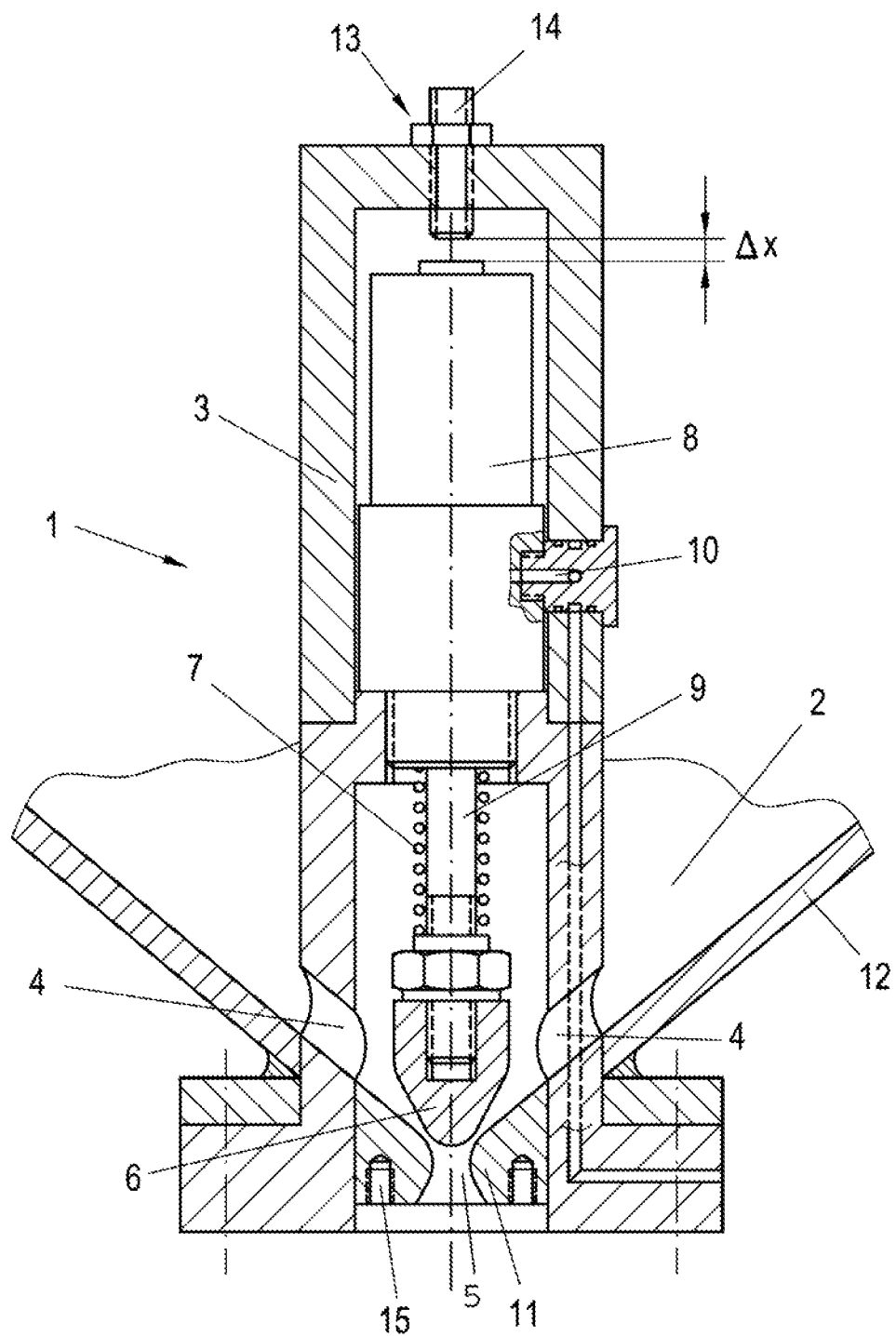
FIG. 1 shows a vertical sectional view of another variant of the metering device operated by compressed air.

FIG. 1 shows a vertical sectional view of a variant of the metering device 1 operated by compressed air. The metering device 1 is arranged in a container 12 for the granular material 2 and comprises a housing 3. At least one inlet 4 for the granular material 2 is preferably arranged laterally of the housing 3. At least one outlet 5 is preferably arranged on the bottom side of the metering device 1, via which outlet 5 the granular material 2 is passed into an underlying device 16 for conveying the granular material 2. The at least one outlet 5 is closed by a sealing element 6. According to the invention, the sealing element 6 is arranged in a metering piston 9 which is preloaded by means of a spring 7 and can be moved axially in a compressed-air cylinder 8, wherein a compressed-air connection 10 is provided on the compressed-air cylinder 8 such that the metering piston 9 can be moved against the spring 7 by means of compressed air and the outlet can be opened. According to the invention, the metering device 1 is operable exclusively by means of compressed air which is fed into the compressed-air cylinder 8 via the compressed-air connection 10 and moves the metering piston 9 against the force of the spring 7. The metering piston 9 is brought into the open position as long as granular material 2 is to be fed into the conveying device 16.

The spring 7 preferably has a two-stage design, so that when compressed air is fed at a first pressure the first stage of the spring 7 can be overcome or pressed together, and when compressed air is fed at a higher pressure also the second stage of the spring 7 can be overcome or pressed together. Thus, the metering piston 9 can be actuated by means of two different strokes, and hence metering of the granular material 2 can take place in at least two different stages. Upon the presence of a corresponding pressure control, an infinitely variable adjustment of the stroke $\Delta x$ of the metering piston 9 and thus a stepless adjustment of the metering quantity of granular material 2 can be effected. Preferably, the sealing element 6 or the metering piston 9 with integrated sealing element 6 is made of a wear-resistant, elastic material and a bushing 11, preferably of a dimensionally stable and highly wear-resistant plastic is arranged in the area of the outlet 5. This achieves optimum sealing of the interior of the container 12 for the granular material 2 and prevents any moisture from entering the inside of the container 12 whenever the granular material 2 is not used.

To take full advantage of the force of gravity, the compressed-air cylinder 8 and the metering piston 9 are arranged essentially vertically inside the container 12 and the container 12 is chamfered on the bottom side, such that the granular material 2 trickles towards the metering device 1 due to the force of gravity. Also the at least one inlet 4, preferably two opposite inlets 4 is/are arranged in a manner extending obliquely downwards, preferably at an angle of 30 to 40° to the horizontal line, to facilitate trickling of the granular material 2. To be able to adjust the maximum stroke $\Delta x_{max}$ of the metering piston 9, an adjustment device 13, for example an adjustment screw 14 can be arranged on the upper end of the metering piston 9. Fasting elements 15 for fastening the conveying device 16 can be provided on the bottom side of the metering device 1. The conveying device 16 can be designed in different ways, for example mechanically or pneumatically.

Figure 2:
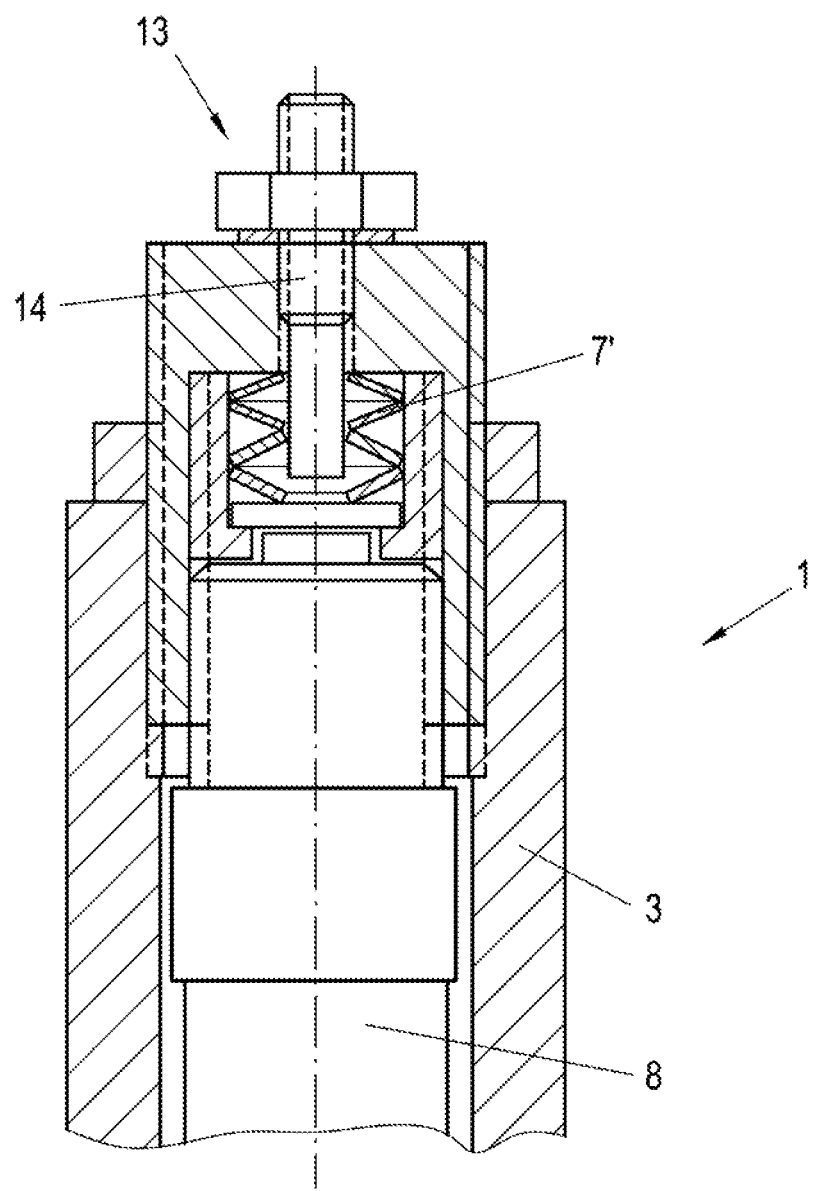
FIG. 2 shows a vertical sectional view of another variant of the metering device operated by compressed air.

FIG. 2 shows a vertical sectional view of another variant of the metering device operated by compressed air. As compared to the variant of embodiment according to FIG. 1, in this variant two springs 7, 7' are arranged, so that upon feeding in compressed air at a first pressure the first spring 7 can be overcome or compressed and upon feeding in compressed air at a higher pressure the second spring 7' can be overcome or compressed. Thus, the metering piston 9 can be actuated by two different strokes and thus metering of the granular material 2 can take place in two different stages. If there exists a corresponding pressure control, a stage-less adjustment of the stroke $\Delta x$ of the metering piston 9 and thus a stage-less adjustment of the metering quantity of granular material 2 can be effected.

Figure 3:
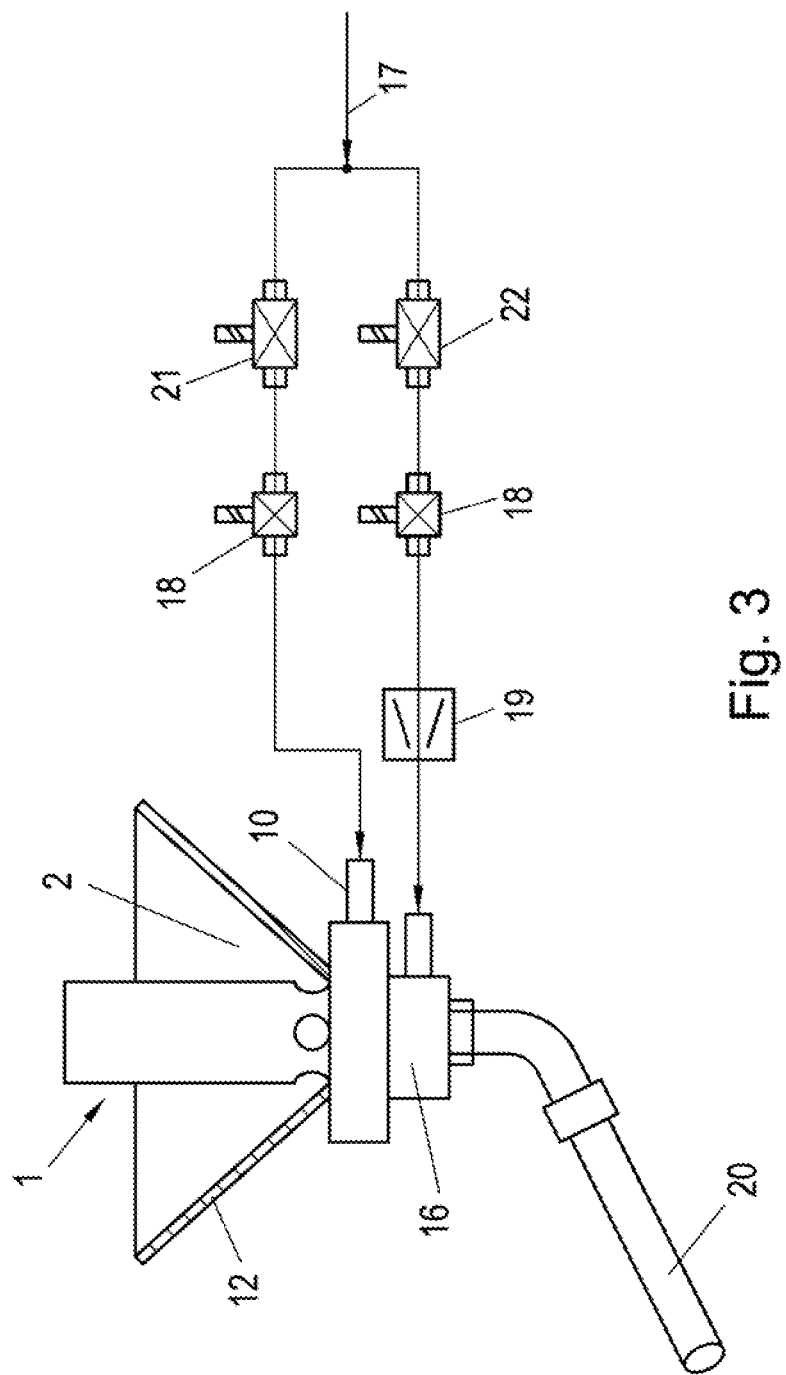
FIG. 3 shows a schematic block diagram of a use of a metering device operated by compressed air in a sand spreader.

FIG. 3 shows a schematic block diagram of a use of a metering device 1 operated by compressed air in a sand spreader. The metering device 1 is arranged inside the container 12 for the granular material 2 and connected to an underlying device 16 for conveying the granular material 2, in particular sand. The metering device 1 is supplied with compressed air via a compressed-air connection 10 from a compressed-air source 17 via a solenoid valve 21. For adjusting the pressure of the compressed air for the compressed-air cylinder 8 at least one pressure controller 18 is arranged. The conveying device 16 is also actuated by compressed air from the compressed-air source 17 via a solenoid valve 22, which is supplied via a pressure controller 18 and at best a reduction nozzle 19. The reduction nozzle 19 serves to simply determine the amount of compressed air supplied and obtain a constant compressed air flow. A separate compressed-air control is achieved by means of the two separated solenoid vales 21, 22, whereby a separate adjustment of the compressed-air cylinder 8 and the compressed air for conveying the granular material 2 is possible. At the outlet of the conveying device 16, the granular material 2 is transported to the desired location between the rail wheel and the rail via a conveying line 20. During braking of the rail-bound vehicle the metering device 1 is activated, i.e. the metering piston 9 in the metering device is raised and the granular material 2 is transported into the conveying device 16, where it is transported into the gap between the rail wheel and the rail via the conveying line 20 and increases the frictional resistance and thus reduces the braking distance.

Figure 4:
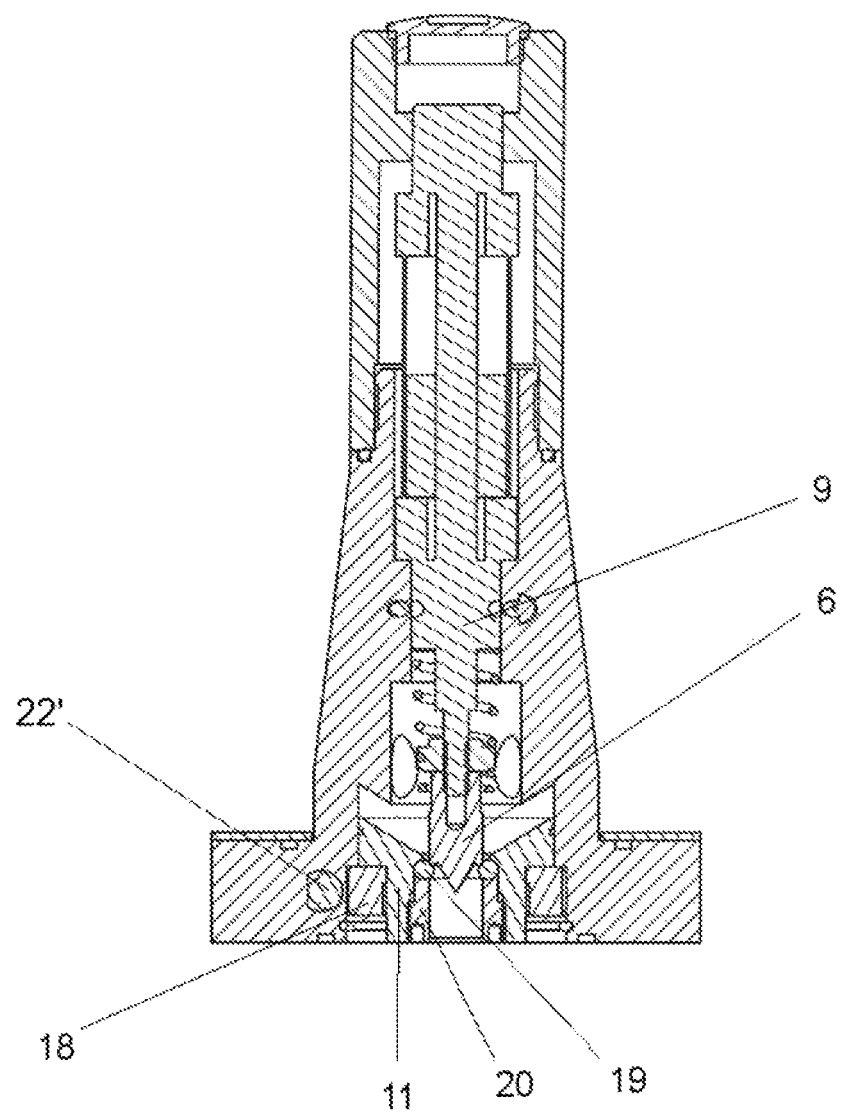
FIG. 4 shows a vertical sectional view of another variant of the metering device operated by compressed air.
Figure 5:
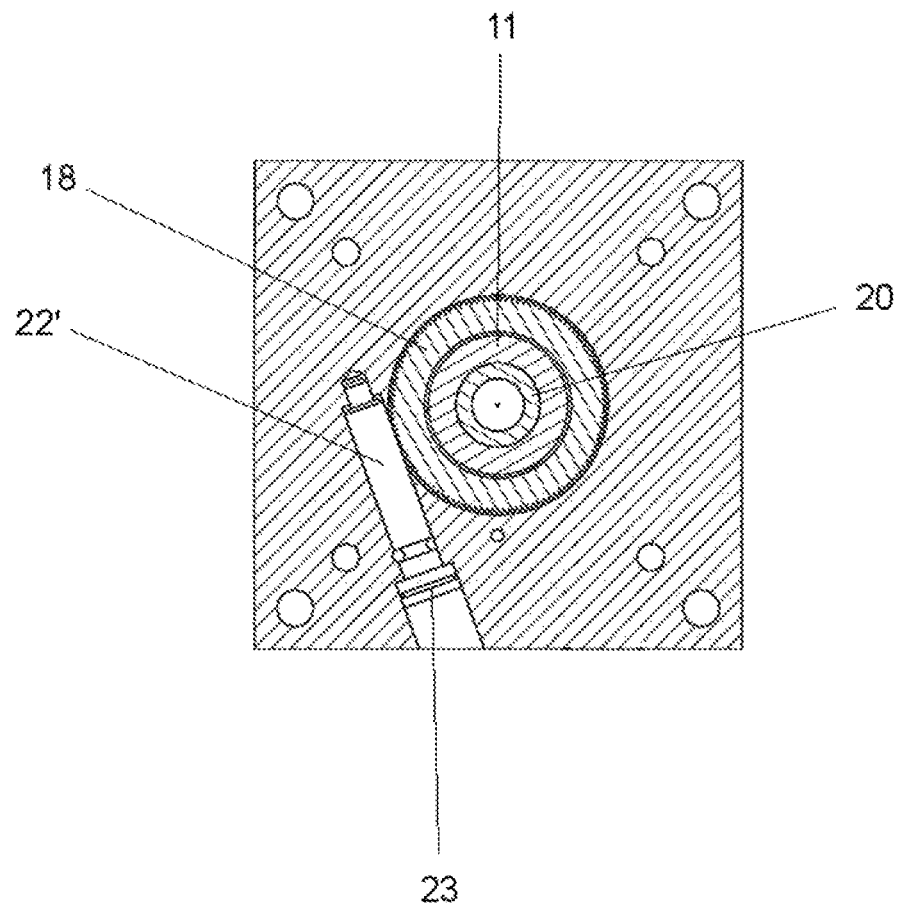
FIG. 5 shows a horizontal sectional view of the metering device operated by compressed air according to FIG. 4.

FIG. 4 and FIG. 5 show another variant of a metering device 1 operated by compressed air in vertical and horizontal sectional views, wherein the maximum stroke $\Delta x_{max}$ of the metering piston 9 is set by means of adjusting the bushing 11 in axial direction, i. e. in the direction of the axis of the metering piston 9. For example, the bushing 11 is arranged shiftably and in a manner secured against turning and comprises a thread on its external surface. The bushing 11 is surrounded by an adjusting nut 18, on whose inner side a thread is provided, engaging in the thread of the bushing 11. The outside of the adjustment nut 18 is provided with gear teeth engaging in the thread of an axially fixed and rotatable drive spindle 22'. The drive spindle 22' comprises a retainer 23 for a tool (not shown). If the drive spindle 22' is turned by the tool, the adjusting nut 18 is turned, whereby the bushing 11 is moved in axial direction. By axially adjusting the bushing 11, the sealing element 6 at best resting on the bushing 11 and the metering piston 9 connected therewith are pressed in function of the rotational direction of the drive spindle 22' either upwards against the force of the spring 7 or downwards by the spring 7, thus enabling the maximum stroke $\Delta x_{max}$ of the metering piston 9 to be adjusted.

For better sealing, a sealing ring 19 made of an elastic material, preferably an O-ring forming the annular sealing area can be arranged on the outlet 5. For fine adjustment of the amount of granular material the sealing ring 19 can be deformed e.g. by a screw bush 20. The screw bush 20 comprises an external thread engaging in a thread located on the internal surface of the bushing 11.

Upon turning the screw bushing 20, in function of the rotational direction, the sealing ring 19 is either squeezed, thus changing the cross-section and reducing the internal diameter, or it is relieved, thus returning to its original cross-section. Upon deformation of the sealing ring 19, the size of the internal opening of the sealing ring 19 is changed, thus adjusting the amount of granular material 2 to be discharged.

The metering device 1 according to the invention is characterized by a particularly simple design and it is exclusively operated by compressed air. Thus, the metering device can be used in a particularly simple manner, also in industrial plants and rail-bound vehicles, where only compressed air is available, and no measures need to be taken to the effect that electric energy is supplied to the metering device 1. This reduces costs and efforts involved in the assembly and favors the option of using the metering device 1 also in older rail-bound vehicles.

The invention claimed is:

1. A metering device for granular material, comprising a housing that can be arranged inside a container for the granular material, the housing comprising at least one inlet for the granular material and an outlet, which outlet can be closed by means of a sealing element, wherein the at least one inlet is arranged laterally on the housing and in a manner extending obliquely downwards, the sealing element is arranged on a metering piston, which is preloaded by means of a spring and can be moved axially in a compressed-air cylinder, wherein a compressed-air connection is provided on the compressed-air cylinder such that the metering piston can be moved against the spring by means of compressed air and the outlet can be opened, the spring having an at least two-stage design such that the stroke of the metering piston can be changed at least in two stages by varying the pressure of the compressed air, a device for adjusting the maximum stroke of the metering piston is provided, and that a bushing made of a dimensionally stable material is arranged in the area of the outlet.

2. The metering device according to claim 1, wherein the bushing is made of a highly wear-resistant plastic.

3. The metering device according to claim 1, wherein the sealing material is made of a wear-resistant elastic material.

4. The metering device according to claim 1, wherein the compressed-air cylinder and the metering piston are arranged vertically.

5. The metering device according to claim 1, wherein the adjustment device is formed by means of an adjustment screw.

6. The metering device according to claim 1, wherein at least two springs are arranged.

7. The metering device according to claim 1, wherein the bushing is adjustable in the direction of the axis of the metering piston such that the maximum stroke of the metering piston can be changed.

8. The metering device according to claim 1, wherein two opposite inlets are provided on the housing.

9. The metering device according to claim 1, wherein the at least one inlet is arranged at an angle of 30 to 40° to the horizontal line, in a manner extending obliquely downwards.

10. The metering device according to claim 1, wherein fastening elements for fastening a device for conveying the granular material are provided on the bottom side of the housing.

11. The metering device according to claim 1, wherein a sealing ring made of an elastic material, preferably an O-ring is arranged in the outlet.

12. The metering device according to claim 11, wherein a device for deforming the sealing ring is provided, for example a screw bush rotatable against the sealing ring.

\* \* \* \* \*